(12) United States Patent
Umemura et al.

(10) Patent No.: US 8,118,745 B2
(45) Date of Patent: Feb. 21, 2012

(54) ULTRASOUND IMAGING APPARATUS

(75) Inventors: Shinichiro Umemura, Sendai (JP); Takashi Azuma, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 934 days.

(21) Appl. No.: 12/039,367

(22) Filed: Feb. 28, 2008

(65) Prior Publication Data

US 2009/0043197 A1 Feb. 12, 2009

(30) Foreign Application Priority Data

Aug. 8, 2007 (JP) .................................. 2007-206936

(51) Int. Cl.
*A61B 8/00* (2006.01)
(52) U.S. Cl. ........................................................ 600/437
(58) Field of Classification Search .................... 600/437
See application file for complete search history.

(56) References Cited

U.S. PATENT DOCUMENTS

| | | | |
|---|---|---|---|
| 6,056,693 A | 5/2000 | Haider | |
| 6,120,448 A * | 9/2000 | Bradley et al. | 600/443 |
| 6,419,632 B1 * | 7/2002 | Shiki et al. | 600/443 |
| 6,458,084 B2 * | 10/2002 | Tsao et al. | 600/443 |
| 2003/0069504 A1 | 4/2003 | Wilkening | |
| 2003/0114758 A1 | 6/2003 | Jensen | |
| 2004/0059221 A1 | 3/2004 | Azuma et al. | |
| 2004/0254462 A1 | 12/2004 | Kawagishi | |

FOREIGN PATENT DOCUMENTS

JP 2004-113364 4/2004

OTHER PUBLICATIONS

Umemura et al, "P3B-8 Signed Echo Imaging with High Axial Resolution" Ultrasonics Symposium, 2007, IEEE, Oct. 1, 2007, pp. 1760-1763.

* cited by examiner

*Primary Examiner* — Jacqueline Cheng
(74) *Attorney, Agent, or Firm* — Mattingly & Malur, PC

(57) ABSTRACT

With a natural number n, an ultrasound pulse having a center frequency of $nf_0$ is transmitted, and an echo wave produced by the reflection at an acoustic-impedance interface within the object to be examined is received. Another ultrasound pulse having a center frequency of $(n+1)f_0$ is transmitted, and, similarly, an echo wave produced by the reflection at an acoustic-impedance interface within the object to be examined is received. The received echo signal which has a center frequency of $nf_0$ is raised to the power of $(n+1)$ in a self-multiplication unit. Meanwhile, The received echo signal having a center frequency of $(n+1)f_0$ is raised to the power of n in another self-multiplication unit. Each multiplication produces a signal having a center frequency of $n(n+1)f_0$. A signed echo signal is obtained by a phase-sensitive detection between the two obtained signals.

10 Claims, 9 Drawing Sheets

Two-time transmission/reception method

Ultrasound frequency

Superposition method

Ultrasound frequency

Band-pass filtration method

0   $f_0$   $2f_0$   $4f_0$   Ultrasound frequency

FIG. 3A
FIG. 3B
Prior Art
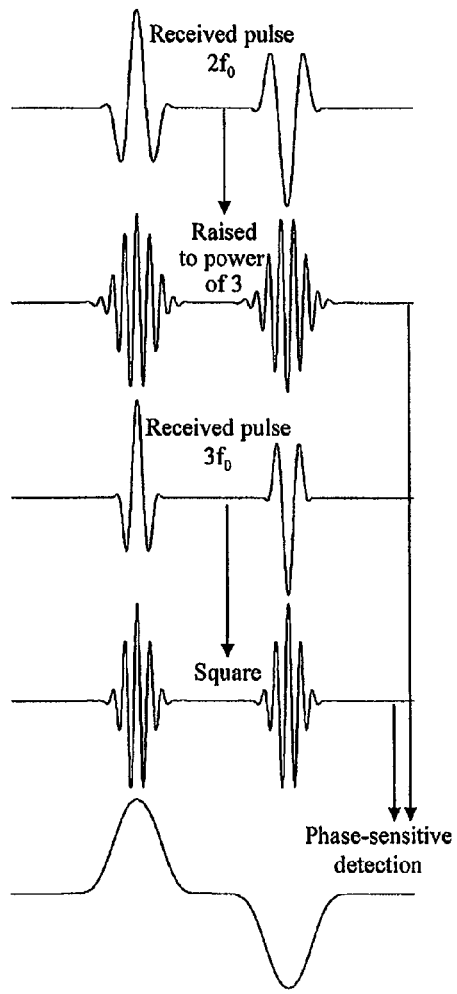
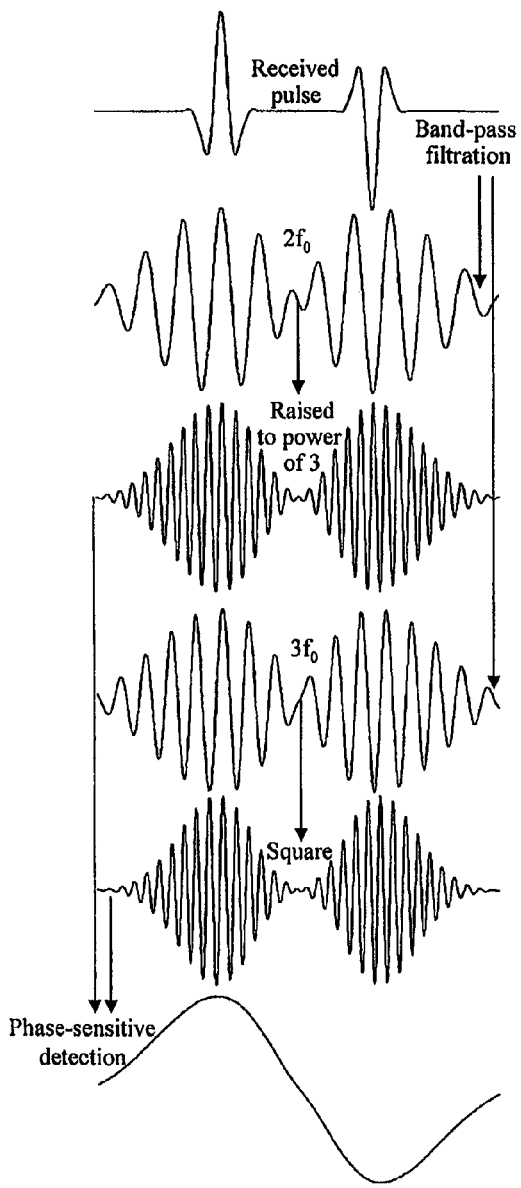

Two-time transmission/reception method

Ultrasound frequency

Superposition method

Ultrasound frequency

Band-pass filtration method

0   $2f_0$   $3f_0$   $6f_0$   Ultrasound frequency

ULTRASOUND IMAGING APPARATUS

CLAIM OF PRIORITY

The present application claims priority from Japanese application JP 2007-206936 filed on Aug. 8, 2007, the content of which is hereby incorporated by reference into this application.

BACKGROUND OF THE INVENTION

1. Field of the Invention

The present invention relates to an ultrasound imaging apparatus used for obtaining, by use of ultrasonic waves, an echogram of the object to be examined.

2. Description of the Related Art

With an ultrasound imaging apparatus for medical diagnostic imaging and by the ultrasonic pulse-echo method, almost real-time images, such as tomograms of soft tissue in a living body and images of bloodstream flowing in a living body, can be displayed on and observed through the monitor. In addition, ultrasound imaging apparatuses are recognized as safer means for medical diagnostic imaging than radiologic diagnostic imaging apparatuses. Such recognition is based on the fact that the ultrasound apparatuses do not require the exposure of the object to radiation, which exposure is inevitable in the case of the radiologic apparatuses. Ultrasound imaging apparatuses are compact and are not expensive. These are reasons for the wide use of ultrasound imaging apparatuses in the field of medicine.

What follows is a description of an imaging operation with a conventional ultrasound imaging apparatus. Waves of ultrasound pulse are transmitted to the object to be examined from an ultrasound probe of the ultrasound imaging apparatus while the probe has an array of piezoelectric bodies. The control of the orientation for the ultrasonic waves transmitted from the array transducer is achieved by adjusting the timing at which each element of the transducer sends waves of ultrasound pulse. Reflection of the ultrasonic pulses thus transmitted occurs in the object to be examined, and echo signals thus produced are received with each of the elements in the array. The echo signals thus received are added while being shifted by an amount of time corresponding to the differences in the distance between the position of the focal point of the reception and the position of each element. The signal from the focal point of the reception is enhanced in this way. A tomogram is obtained by scanning the entire area within the object to be examined for the focal points. Creation of a tomogram in the conventional ultrasonic pulse-echo imaging apparatus is achieved in the following way. Firstly, echoes produced by the reflection at the interface where the acoustic impedance changes are received. Then, signal amplitude is obtained from the received signals through an envelope detection processing. After that, luminance of each pixel displayed on the monitor is modulated in accordance with the signal amplitude obtained by the above processing to form a tomogram.

Incidentally, it is worthwhile to pay attention to the phase of the echo produced by the reflection at the interface where the acoustic impedance changes. The echo produced at the interface where the acoustic impedance is to be increased has the same phase as the transmitted pulse has. In contrast, the echo produced at the interface where the acoustic impedance is to be decreased has a phase that is opposite to the phase of the transmitted pulse. In other words, the sign that an echo has corresponds to the increase or the decrease of the acoustic impedance that is to take place at the interface.

Japanese Patent Application Publication 2004-113364 discloses a conventional technique to detect the signs of echoes for image creation. What follows is a description of the disclosed conventional technique. Refer to the waveform diagram in FIG. 1B. An ultrasound pulse having a center frequency of a fundamental frequency $f_0$ is superposed with another ultrasound pulse having a center frequency of a second harmonic frequency $2f_0$ to produce still another ultrasound pulse. The ultrasound pulse thus produced is then transmitted, and its reflection at an acoustic-impedance interface within the object to be examined produces an echo wave, which is to be received. FIG. 1B shows both an echo wave produced by the reflection at an interface where the acoustic impedance is to be increased and an echo wave produced by the reflection at an interface where the acoustic impedance is to be decreased. Then, the received echo wave is subjected to a band-pass filtration processing so as to separate an echo signal having a center frequency of the second harmonic frequency $2f_0$ from another echo signal having a center frequency of the fundamental frequency $f_0$. The echo signal with the fundamental frequency is squared to obtain a reference echo signal having a center frequency of the second harmonic frequency $2f_0$. Note that this reference echo signal always has a constant sign irrespective of which of the signs the echo has. With the phase of this reference echo signal being as the reference, the second harmonic echo signal having a center frequency of the same second harmonic frequency $2f_0$ is subjected to a phase sensitive detection processing. In this way, the sign of the echo is detected.

When the ultrasound echo method is brought into practice, the following fact needs to be taken into consideration. In addition to the phase shift that occurs at an acoustic-impedance interface, there is a phase shift that occurs during the propagation of the waves in the medium in which there is no acoustic impedance. This is why the phase of the abovementioned reference echo has to be employed as the reference. Such a phase shift that occurs during the propagation is explained in the following way. The attenuation in a living body becomes larger as the frequency becomes higher. Accordingly, as the reflected signal comes from a deeper portion of a living body and so is propagated for a longer distance, the higher-frequency component of the signal is more likely to be lost. As a consequence, the center frequency of the reflected signal is shifted to the lower-frequency side by an amount corresponding to the depth of the portion from which the reflected echo comes. Signal processing carried out on the assumption of a constant center frequency despite the fact that the center frequency is actually shifted causes an apparent phase rotation of the reflected signal. With nothing extra being done, there is no way to distinguish a phase rotation caused by the change in the hardness from a phase rotation caused by the shifting of the center frequency. If a living body were a perfectly homogeneous medium, the correction for the shifting of the center frequency would be possible. Such correction in practice, however, is not so easy because both the sound propagation speed and the attenuation coefficient vary from place to place within a living body. The disclosure of Japanese Patent Application Publication 2004-113364 makes a distinction between the two types of phase rotation by employing the phase of the reference echo as the reference, and extracts the phase rotation caused by the change in the hardness.

SUMMARY OF THE INVENTION

The method of the conventional technique, however, has its own drawbacks. For example, a band-pass filter is used to separate the echo signal having a center frequency of the second harmonic frequency $2f_0$ from the echo signal having a center frequency of a fundamental frequency $f_0$. This use of the band-pass filter elongates the two echo signals after the band-pass filtration processing, in the direction of the temporal axis. Accordingly, the signed echo signal thus obtained is also elongated in the direction of the temporal axis. This in turn deteriorates the distance resolution of the signed echogram in comparison to the echogram obtained by way of the envelope detection. As a result, when this conventional method is employed without any improvement, it is difficult to obtain a signed echogram that describes such things as plaques formed thinly on the vascular endothelium.

The present invention has been made in view of the above-mentioned difficulty of the conventional technique. An object of the present invention is providing an ultrasound imaging apparatus capable of producing a signed echogram which suffers only small deterioration for the distance resolution, as compared to the distance resolution of an echogram obtained by way of the envelope detection.

In the ultrasound imaging apparatus according to an aspect of the present invention, a signed echo signal is obtained in the following way. Assume that: n represents an even natural number; m represents an odd natural number; $nk_1=mk_2$ represent the least common multiple of n and m; f represents a frequency. A probe is controlled so as to transmit both a first transmission signal and a second transmission signal. The first transmission signal is an ultrasound signal having a center frequency of nf while the second transmission signal is an ultrasound signal having a center frequency of mf. An ultrasound signal received in response to the transmission of the first transmission signal is raised to the power of $k_1$ to obtain a first echo signal having a center frequency of $nk_1f$ while an ultrasound signal received in response to the transmission of the second transmission signal is raised to the power of $k_2$ to obtain a second echo signal having a center frequency of $nk_2f$. A phase-sensitive detection processing is carried out between the first echo signal and the second echo signal, and then, from the results of the phase-sensitive detection processing, a signed echo signal is obtained.

The signed echogram obtained according to the aspect of the present invention is produced by use of an ultrasound pulse that uses the entire bandwidth of an ultrasound transducer. The signed echogram thus produced reflects the acoustic impedance of the object to be imaged without sacrificing the excellent distance resolution that is made possible by the above-mentioned use of the ultra sound pulse. Accordingly, the ultrasound imaging apparatus provided according to the aspect of the present invention is capable of producing such an excellent signed echogram.

BRIEF DESCRIPTION OF THE DRAWINGS

FIGS. 3A and 3B are diagrams showing a comparison between the two-time transmission/reception method according to the present invention and a conventional method employing a band-pass filtration processing.

DESCRIPTION OF THE PREFERRED EMBODIMENTS

An imaging method of the present invention will be described with reference to the waveform diagram in FIG. 1A. The method starts with a transmission of an ultrasound pulse having a center frequency of a fundamental frequency $f_0$ and the reception of an echo signal produced by the reflection of the transmitted pulse at an acoustic-impedance interface within an object to be examined. In addition, another ultrasound pulse having a center frequency of a second harmonic frequency $2f_0$ is also transmitted, and then another echo signal produced by the reflection of the transmitted pulse at the acoustic-impedance interface within the object to be examined is received as in the above-described case. In summary, a fundamental echo signal and a second harmonic echo signal are obtained by their respective transmission/reception sequences that are carried out independently and twice in total.

After that, the fundamental echo signal is squared to obtain a reference echo signal having a center frequency of a second harmonic frequency $2f_0$. By using the phase of this reference echo signal as a reference, the second harmonic echo signal 120 having a center frequency of a second harmonic frequency $2f_0$ is then subjected to a phase-sensitive detection processing to detect the sign of the echo.

Figure 2A:
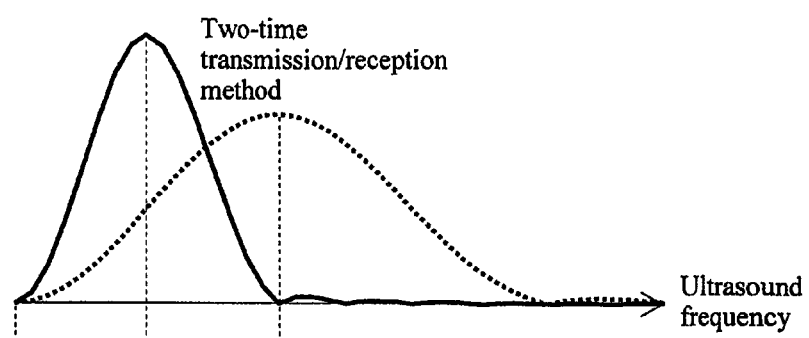
FIGS. 2A to 2C are diagrams showing a comparison of an ultrasound spectrum obtained by the two-time transmission/reception method according to the present invention and ultrasound spectrums obtained respectively by a conventional superposition method and by a conventional method employing a band-pass filtration processing.
Figure 2B:
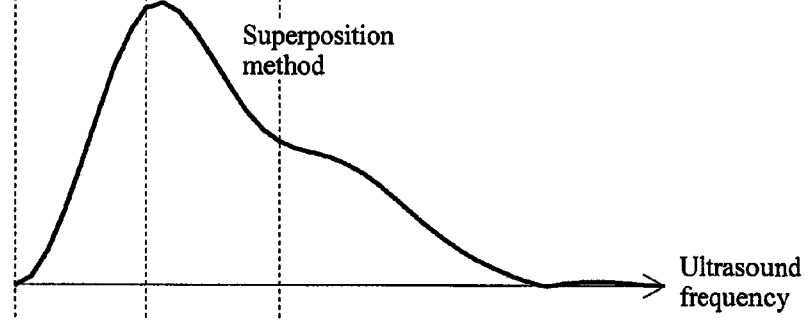
Figure 2C:
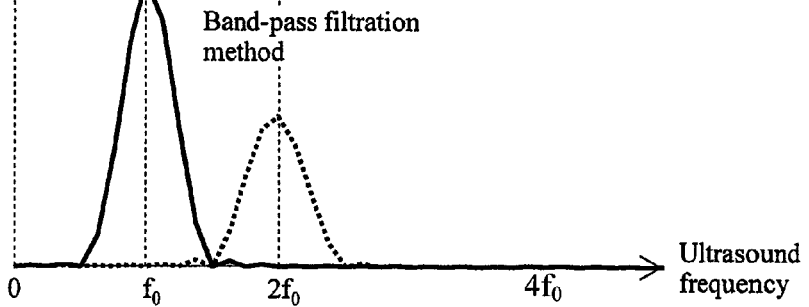

The imaging method of the present invention employs no band-pass filter that may possibly cause the elongation of the echo signal in the direction of the temporal axis. Accordingly, a signed echogram can be produced while causing no degradation in the distance resolution. A frequency-domain description of this point will be given with reference to the ultrasound spectrums shown in FIGS. 2A to 2C. Note that the ultrasound transducer in this example has a frequency band in a range from 0 to $4f_0$. FIG. 2A shows an ultrasound spectrum obtained by the method according to the present invention (hereafter also referred to as the two-time transmission/reception method). FIG. 2B shows an ultrasound spectrum obtained by a superposition method (the transmitting and receiving of the fundamental wave and the second harmonic wave superposed on each other), and FIG. 2C shows an ultrasound spectrum obtained by a conventional method employing a band-pass filtration processing.

In the two-time transmission/reception method according to the present invention, as shown in FIG. 2A, an ultrasound pulse that fully uses the entire bandwidth $4f_0$ of the ultrasound transducer can be employed as the pulse having a center frequency of the second harmonic frequency $2f_0$. The ultrasound pulse employed for this purpose is plotted by the broken line in FIG. 2A. Meanwhile, an ultrasound pulse having a bandwidth $2f_0$, which is half the bandwidth of the above-mentioned ultrasound pulse, can be employed as the pulse having a center frequency of the fundamental frequency $f_0$. The ultrasound pulse employed for this purpose is plotted by the solid line in FIG. 2A. In a comparative case, that is, in a case where the two pulses are separated through a band-pass filtration processing by use of a superposed wave, each of the bandwidths is no more than $f_0$ as shown in FIG. 2C. To put it other way, according to the imaging method of the present invention, the number of transmission/reception times needed for imaging is twice larger than that in the case of the conventional technique disclosed in Japanese Patent Application Publication 2004-113364, and, as a result, the imaging speed is half slower than the imaging speed achievable by the conventional technique. Meanwhile, the distance resolution achievable according to the imaging method of the present invention is twice to four times more excellent than the distance resolution achievable by the conventional technique.

In addition, the imaging method according to the present invention can be generalized in the following way. Assume that $n_1$ represents a positive odd number and $n_2$ represents a positive even number. An ultrasound pulse having a center frequency of $n_1 f_0$ is transmitted so as to obtain an echo wave produced by the reflection at an acoustic-impedance interface within the object to be examined. In addition, another ultrasound pulse having a center frequency of $n_2 f_0$ is transmitted so as to obtain, similarly, another echo wave produced by the reflection at an acoustic-impedance interface within the object to be examined. Here, when the least common multiple of $n_1$ and $n_2$ is represented by $n_1 m_2 = n_2 m_1$, $m_1$ is an odd number and $m_2$ is an even number. Then, the received echo signal having a center frequency of $n_1 f_0$ is raised to the power of $m_2$, while the received echo signal having a center frequency of $n_2 f_0$ is raised to the power of $m_1$. Thus obtainable are signals each of which has a center frequency of $n_1 m_2 f_0 = n_2 m_1 f_0$. As a result, a phase-sensitive detection processing can be carried out between the two signals thus obtained. Here, the signal obtained from the echo signal raised to the power of $m_2$, which is an even number, always has a positive sign while the signal obtained from the echo signal raised to the power of $m_1$, which is an odd number, always inherits the sign of the original echo. Accordingly, the result of the phase-sensitive detection processing between the two obtained signals always inherits the sign of the original echo. The detection of the received echo signal can be accomplished in this way.

According to one of the most typical selecting ways for the center frequencies, while n is a natural number, a frequency $nf_0$ and another frequency $(n+1)f_0$ are respectively selected as the central frequencies for the transmitted ultrasound pulses. To be more specific, an ultrasound pulse having a center frequency of $nf_0$ is transmitted so as to obtain an echo wave produced by the reflection at an acoustic-impedance interface within the object to be examined. In addition, another ultrasound pulse having a center frequency of $(n+1)f_0$ is transmitted so as to obtain, similarly, another echo wave produced by the reflection at an acoustic-impedance interface within the object to be examined. Then, the received echo signal having a center frequency of $nf_0$ is raised to the power of $(n+1)$ while the received echo signal having a center frequency of $(n+1)f_0$ is raised to the power of n. Thus obtainable are signals each of which has a center frequency of $n(n+1)f_0$. Here, one of n and $(n+1)$ is an even number, while the other is an odd number.

Accordingly, as in the above-described case, a phase-sensitive detection processing can be carried out between the two signals thus obtained, and the detection of the received echo signal can be accomplished in this way. When the center frequencies of the transmitted pulses are selected as has just been described, the extent to which the ultrasound frequency bands of the two received echo signals are overlapped with each other can be made larger. Accordingly, the similarity between the two signals as scatterer echoes for the object to be examined becomes higher, and a signed echo signal that more faithfully reflect the scatterer.

Figure 1A:
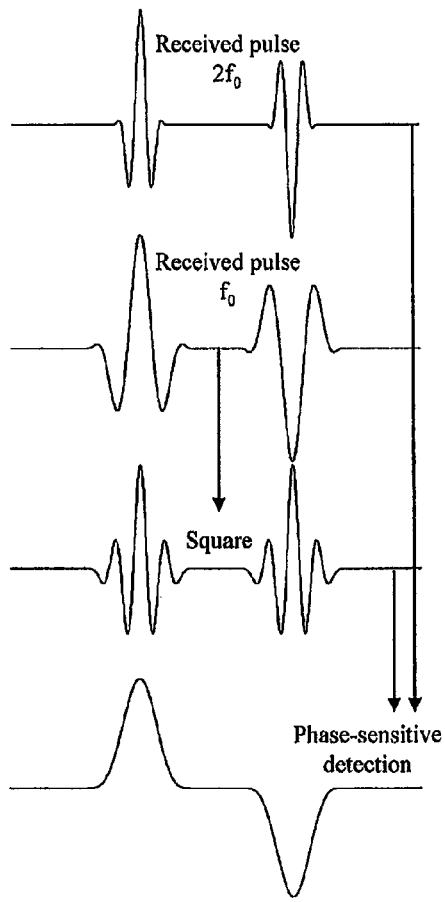
FIGS. 1A and 1B are diagrams showing a comparison between a two-time transmission/reception method according to the present invention and a conventional method employing a band-pass filtration processing.
Figure 1B:
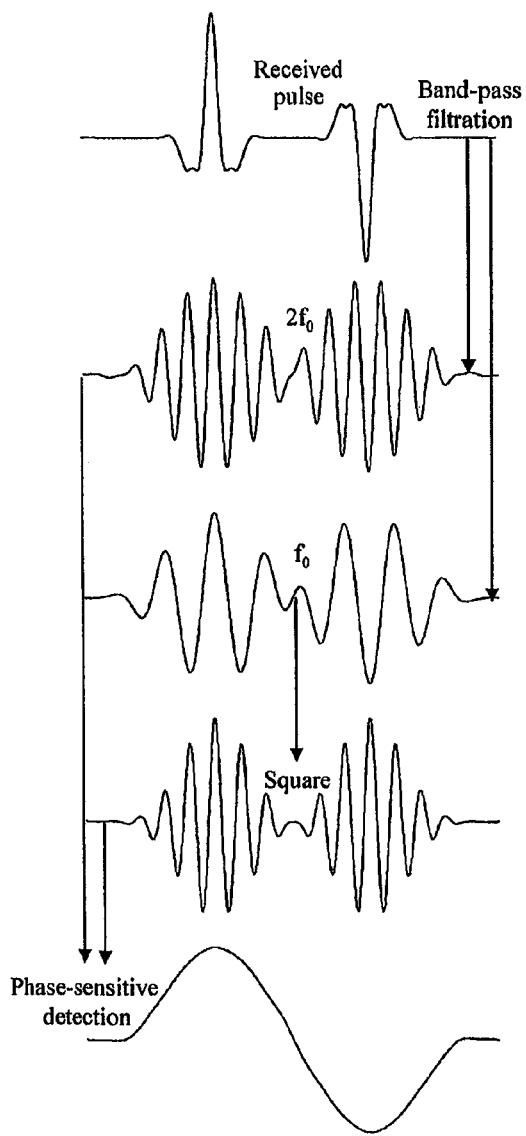
Figure 4A:
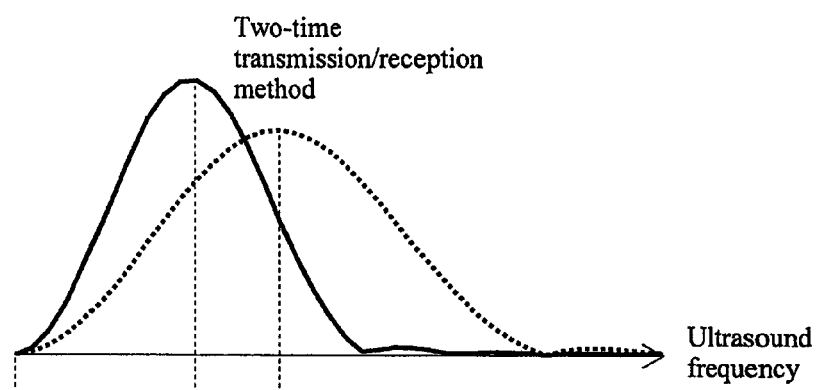
FIGS. 4A to 4C are diagrams showing a comparison of an ultrasound spectrum obtained by the two-time transmission/reception method according to the present invention and ultrasound spectrums obtained respectively by a superposition method and by a conventional method employing a band-pass filtration processing.
Figure 4B:
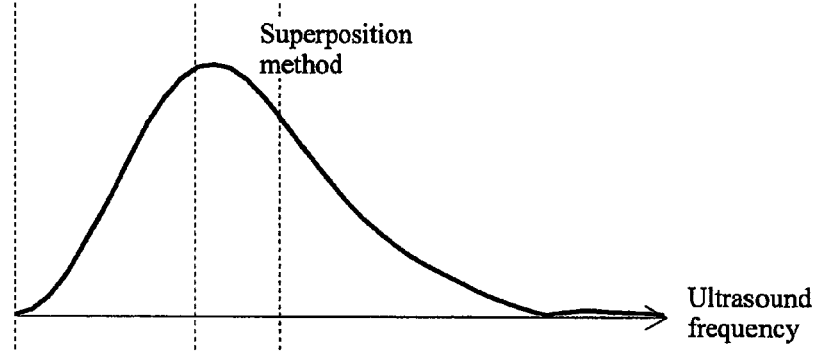
Figure 4C:
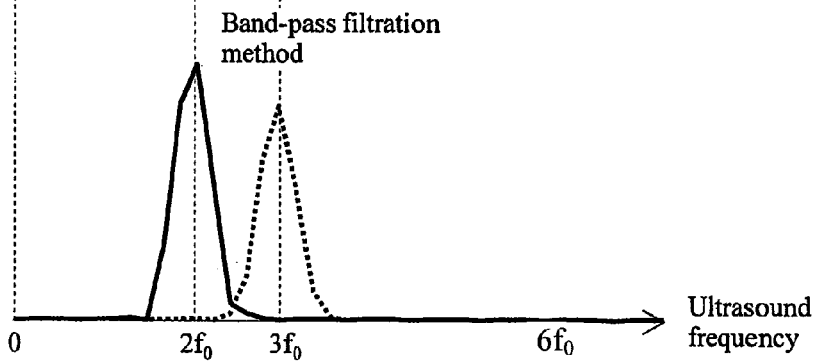

FIGS. 3A and 3B together with FIGS. 4A to 4C, as in the case of FIGS. 1A and 1B together with FIGS. 2A to 2C, show an imaging method according to the present invention in comparison to the conventional method employing a band-pass filtration processing. Note that, what is shown by FIGS. 3A and 3B together with FIGS. 4A to 4C is a case where n=2. FIG. 3A is a waveform diagram for the imaging method according to the present invention while FIG. 3B is a waveform diagram for the method employing a band-pass filtration processing. A signal having a center frequency of $6f_0$ and obtained by raising a received echo signal having a center frequency of $2f_0$ to the power of 3 always inherits the sign of the original echo. Meanwhile, a signal having a center frequency of $6f_0$ and obtained by raising a received echo signal having a center frequency of $3f_0$ to the power of 2 always has a constant sign irrespective of the sign of the echo, and so can be employed as a reference signal. A signed echo signal can be obtained through a phase-sensitive detection processing of the former one of the above-described two signals having a common center frequency of $6f_0$ carried out by using the phase of the latter one of the two signals as the reference.

The imaging method of the present invention employs no band-pass filter that may possibly elongate the echo signal in the direction of the temporal axis. The feature of such an imaging method without any band-pass filter is more prominent in the case shown in FIGS. 3A and 3B than in the case of FIGS. 1A and 1B. A frequency-domain description of this point will be given with reference to the ultrasound spectrums shown in FIGS. 4A to 4C. Note that the ultrasound transducer in this example has a frequency band in a range from 0 to $6f_0$. FIG. 4A shows an ultrasound spectrum obtained by the two-time transmission/reception method according to the present invention. FIG. 4B shows an ultrasound spectrum obtained by a superposition method (the transmitting and receiving of the fundamental wave and the second harmonic wave superposed on each other), and FIG. 4C shows an ultrasound spectrum obtained by a conventional method employing a band-pass filtration processing.

In the two-time transmission/reception method according to the present invention, as shown in FIG. 4A, an ultrasound pulse that fully uses the entire bandwidth $6f_0$ of the ultrasound transducer can be employed as the pulse having a center frequency of $3f_0$. The ultrasound pulse employed for this purpose is plotted by the broken line in FIG. 4A. Meanwhile, an ultrasound pulse having a bandwidth $4f_0$ can be employed as the pulse having a center frequency of $2f_0$. The ultrasound pulse employed for this purpose is plotted by the solid line in FIG. 4A. In a comparative case, that is, in a case where the two pulses are separated through a band-pass filtration processing by use of a superposed wave, each of the bandwidths is no more than $f_0$ as shown in FIG. 4C. To put it other way, the distance resolution achievable according to the imaging method of the present invention is four to six times more excellent than the distance resolution achievable by the conventional method employing a band-pass filtration processing.

As has been described above, when n≧2, the method employing a band-pass filtration processing is significantly poorer in practical use than the two-time transmission/reception method of the present invention. Accordingly, the inventors can conclude that the method of the present invention provides the only practical option.

Hereafter, detailed descriptions of examples of the present invention will be given with reference to accompanying drawings.

Example 1

Figure 5:
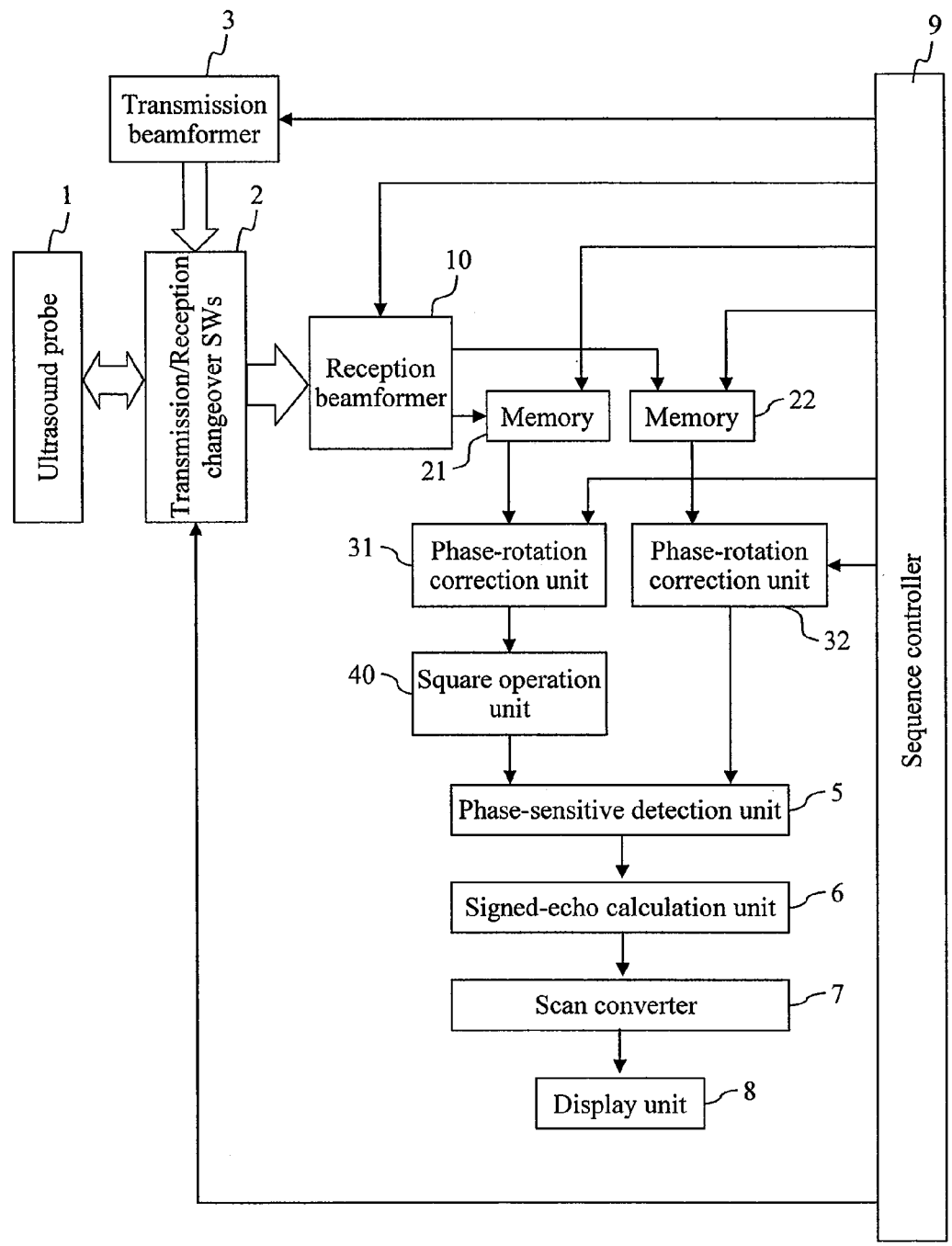
FIG. 5 is a diagram showing an example of the configuration of an ultrasound imaging apparatus according to the present invention.

FIG. 5 is a diagram showing an example of the configuration of an ultrasound imaging apparatus that produces a signed echogram in Example 1 of the present invention. In this Example 1, a signed echo signal for the object to be examined is obtained, as shown in FIG. 1A, in the following way. Firstly, an ultrasound pulse having a center frequency of a fundamental frequency $f_0$ is transmitted, and an echo wave produced by the reflection at an acoustic-impedance interface within the object to be examined is received. In addition, an ultrasound pulse having a center frequency of a second harmonic frequency $2f_0$ is transmitted, and, similarly, an echo wave produced by the reflection at an acoustic-impedance interface within the object to be examined is received. On the basis of these two received echo signals obtained in this way, a signed echo signal for the object to be examined is generated.

An ultrasound probe 1 transmits an ultrasound pulse to an object to be examined (not illustrated) and receives an ultrasound echo from the object to be examined. A transmission beamformer 3, which is under the control a sequence controller 9, gives an orientation to the transmission pulse, while two types of wave form are used for their respective purposes. The transmission pulse is sent to the ultrasound probe 1 via a transmission/reception changeover switches 2 (transmission/reception changeover SWs 2), which is also under the control the sequence controller 9. The transmission pulse is then transmitted as ultrasound. The ultrasound pulse thus transmitted is reflected or scattered within the object to be examined, and then an ultrasound echo returns to the ultrasound probe 1. The returned ultrasound echo is then converted into an electric signal by the ultrasound probe 1, and subsequently sent to a reception beamformer 10 via, again, the transmission/reception changeover SWs 2. The reception beamformer 10, which is under the control the sequence controller 9, adjusts the delay time in accordance with the reception timing on the basis of the transmission timing (that is, performs dynamic focusing).

The echo signal that is received immediately after the transmission of an ultrasound pulse having a center frequency of the fundamental frequency $f_0$ is temporarily stored in a reception memory 21. Meanwhile, the echo signal that is received immediately after the transmission of an ultrasound pulse having a center frequency of the second harmonic frequency $2f_0$ is temporarily stored in a reception memory 22. The echo signals retrieved from the memories 21 and 22 are sent, respectively, to phase-rotation correction units 31 and 32. In the phase-rotation correction units 31 and 32, phase rotations caused by the ultrasound probe 1, the transmission/reception changeover SWs 2, the transmission beamformer 3, the reception beamformer 10, and the like. The phase rotations caused by such hardware as the above-mentioned components of the apparatus can be corrected by a calibration which is performed before the apparatus is shipped from the factory. The calibration is performed by receiving an echo signal from a sample that has a previously known phase rotation, such as the acoustic impedance and the attenuation depending on the frequency.

The fundamental echo signal that is outputted from the phase-rotation correction unit 31 is inputted into a square operation unit 40. The fundamental echo signal thus inputted is squared and is outputted as a reference echo signal having a center frequency of $2f_0$. Now, assume that the fundamental echo signal having a center frequency $f_0$ and outputted from the phase-rotation correction unit 31 is expressed as follows by use of orthogonal functions of sine and cosine: $C_1(t)\cos(\omega_0 t)+S_1(t)\sin(\omega_0 t)$. Then, the square operation in the square operation unit 40 is equivalent to the outputting, in accordance with the addition theorem, of $C_{12}(t)=C_1^2-S_1^2$ and $S_{12}(t)=2C_1S_1$. Here, t represents time, $C_1(t)$ and $S_1(t)$ represent real amplitudes, and $\omega_0 t=2\pi f_0$. The outputted signal and the second harmonic echo signal outputted from the phase-rotation correction unit 32 are inputted into a phase-sensitive detection unit 5. A phase-sensitive detection processing can be performed between these inputted signals as these signals have the same center frequency. So, in the phase-sensitive detection unit 5, the signal outputted from the phase-rotation correction unit 32 is subjected to a phase-sensitive detection processing by use of the signal outputted from the square operation unit 40 as the reference signal. The result of the phase-sensitive detection processing is outputted from the phase-sensitive detection unit 5. Note that when the second harmonic echo signal outputted from the phase-rotation correction unit 32 is expressed as: $C_2(t)\cos(2\omega_0 t)+S_2(t)\sin(2\omega_0 t)$, then the operation in the phase-sensitive detection unit 5 is equivalent to obtaining $C_{012}(t)=C_2C_{12}+S_2S_{12}$ and $S_{012}(t)=C_{12}S_2-C_2S_{12}$. The graph at the lowest position in FIG. 1A schematically shows the obtained amplitude of $C_{012}(t)$ in a compressed manner.

The signal outputted from the phase-sensitive detection unit 5 is inputted into a signed-echo calculation unit 6. The amplitude of the signal thus inputted is compressed and the compressed signal is then subjected to an unillustrated filtering process that is publicly known. After the filtering process, the signal is outputted from the signed-echo calculation unit 6. The outputted signal is then sent to a scan converter 7, and then an image is displayed on a display unit 8. The display unit 8 may be configured to display either a conventional B-mode image obtained by way of the envelope detection or a signed echogram obtained by the phase-sensitive detection. Alternatively, the display unit 8 may be configured to display both of the above-mentioned images either side by side with each other or in a way that the two images are superposed with each other. Since the signed echogram corresponds to the spatial differential of the acoustic impedance, a signal that is proportional to the acoustic impedance is obtained by integrating the signed echogram in the direction of the sound propagation. Note that the display unit 8 is capable of displaying an acoustic-impedance image in addition to the signed echogram.

When the signed echogram and the acoustic-impedance image are displayed, not only a conventional gray-scale display but also a color display can be employed. The color display, when it is employed, can contribute to an improvement in visibility. A possible way of displaying is achieved by use of a color map. In a possible color map, green is displayed when the amplitude of an echo is small, blue is displayed when the amplitude is large and positive, and red is displayed when the amplitude is large but negative. In addition, in the case of displaying the acoustic impedance, different colors may be used for portions that differ from each other in hardness. For example, while the portion with the hardness that is greater than the average is displayed in red, the portion with the hardness that is smaller than the average is displayed in blue. Moreover, in the present invention, it is also possible to display an arbitrary phase component, by use of a complex received signal having its phase corrected. Some of the modes of display that the present invention provides are effective for the purpose of monitoring the temporal change of the acoustic impedance, such as in a case of monitoring a thermal coagulation treatment by use of a high-intensity focused ultrasound or an RF wave. Examples of such modes that are effective for this purpose are the displaying of the signed echogram, that of the acoustic impedance, that of the signed echo component varying with time, that of the acoustic impedance component varying with time.

Figure 9:
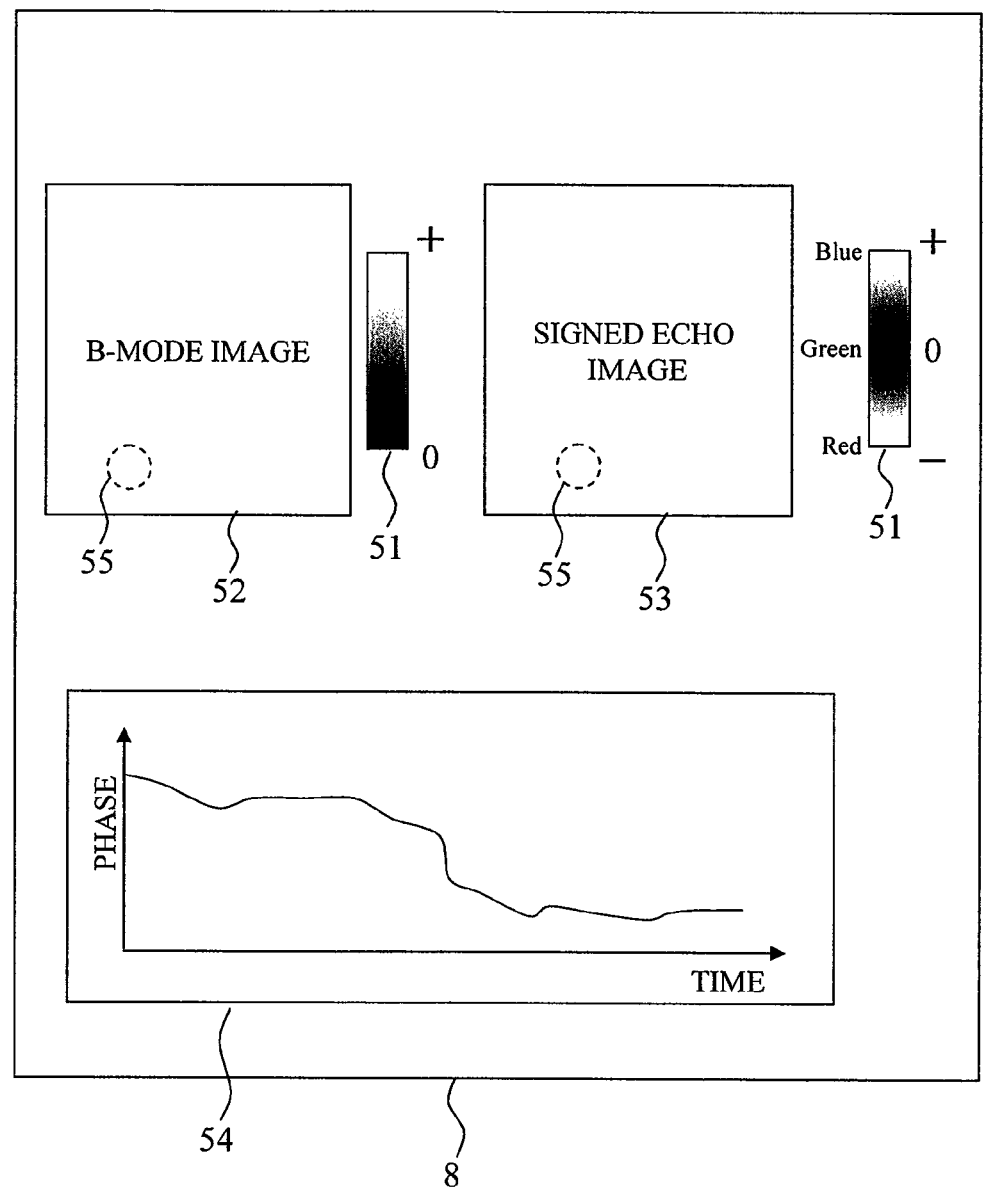
FIG. 9 is a diagram showing an example of images which appears on the display portion of the present invention.

FIG. 9 illustrates an example of display according to the present invention. The conventional B-mode image is displayed at the upper left of the screen, while the signed echogram of the present invention is displayed at the upper right thereof. When the apparatus of the present invention is employed for the monitoring in a thermal coagulation treatment, a precise control of the treatment can be achieved by displaying the temporal change of the average value for the phase of the echo signal concerning a portion to be focused upon 55. The display in the lower half portion of FIG. 9 is an example of the temporal change.

Subsequently, the space resolution and the bandwidth will be described. What follows is a description of the pulse width in the direction of the temporal axis and the bandwidth in the frequency space in the case of a pulse with a Gaussian envelope.

When the envelope of the pulse along the temporal axis is expressed by $\exp(-\alpha t^2)$, the Fourier transform of the envelope is expressed by:

$$\sqrt{(\pi/\alpha)}\exp(-\pi(\sqrt{(\pi/\alpha)}f)^2)$$

As a result, when the result is expressed by the half-value width, the half-value width of the pulse is expressed by $2\sqrt{(\ln 2/\alpha)}$ while the half-value width of the bandwidth in the frequency space is expressed by $2\sqrt{(\alpha \ln 2)/\pi}$. While the pulse width along the temporal axis expressed by $\Delta t$, and the half-value width of the band in the frequency space is expressed by $\Delta f$, $\Delta f = 4 \ln 2/(\pi \Delta t)$. This indicates that the space resolution (acoustic velocity multiplied by the pulse width along the temporal axis) and the bandwidth in the frequency space are inversely proportional to each other. In practice, since a Gaussian function never has a value zero even at infinity along the temporal axis, the transformation has to be stopped within a certain finite temporal width. In this strict sense, the above function is not a Gaussian function, so that the relationship between the bandwidth in the frequency space and the space resolution is not exactly the same as the above equation in some cases. Nevertheless, the bandwidth and the space resolution can be associated, at least approximately, with each other on the basis of the above equation. For example, in the case of using a pulse waveform with two cycles in the center frequency of 2 MHz, the pulse width $\Delta t = \frac{1}{2}$ MHz$\times 2 = 1 \times 10^{-6}$ seconds. Therefore, in accordance with the above equation, $\Delta f = 0.88$ MHz. In this case, the fractional bandwidth (bandwidth/center frequency) is 44%.

Next, a description will be given of the limit of overlapping of the bandwidths of two transmission signals. There are various ways to define the overlapping of two frequency bands of $f_0$ and $2f_0$. The use of the overlap integration of the spectrums is an example of the ways. Here, for the sake of simplicity, the bandwidth of the portion where the two frequency bands overlap each other is used as the indicator of the degree of the overlapping of the two frequency bands. Now, assume a case of using $f_0$ and $2f_0$ shown in FIG. 2. With a constant fractional bandwidth $df/f_0$, the center frequency $f_0$ has a bandwidth in a range from $f_0-df/2$ to $f_0+df/2$, and the center frequency $2f_0$ has a bandwidth in a range from $2f_0-df$ to $2f_0+df$. In this case, when $df<(2/3)f_0$, no overlapping of the bandwidths exists. When $(2/3)f_0<df<2f_0$, the overlapping is $(3/2)df-f_0$. When $df>2f_0$, the entire bandwidth of the center frequency $f_0$ is included in the bandwidth of the center frequency of $2f_0$.

Next, the overlapping of bandwidths is calculated for the case, shown in FIG. 4, of the center frequencies of $2f_0$ and $3f_0$. Here, the center frequency $2f_0$ has a bandwidth in a range from $2f_0-df/2$ to $2f_0+df/2$, and the center frequency $3f_0$ has a bandwidth in a range from $3f_0-(3/2)df$ to $3f_0+(3/2)df$. In this case, when $df<(2/5)f_0$, no overlapping of the bandwidths exists. When $(2/5)f_0<df<2f_0$, the overlapping is $(5/2) df-f_0$. When $df>2f_0$, the entire bandwidth of the center frequency $2f_0$ is included in the bandwidth of the center frequency of $3f_0$. In the current state of the art for the ultrasound probes, a fractional bandwidth of 200% is hard to be achieved. Practically achievable overlapping widths of the bandwidths are $(3/2)df-f_0$ in the case of $f_0$ and $2f_0$ and $(5/2)df-f_0$ in the case of $2f_0$ and $3f_0$.

Figure 8A:
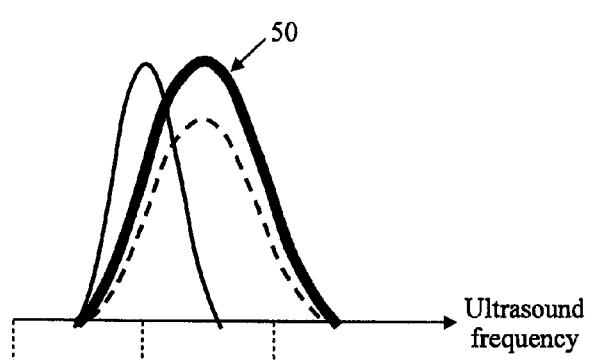
FIGS. 8A and 8B are diagrams showing relationships between the band of each of two transmission signals and the bandwidth of a probe.
Figure 8B:
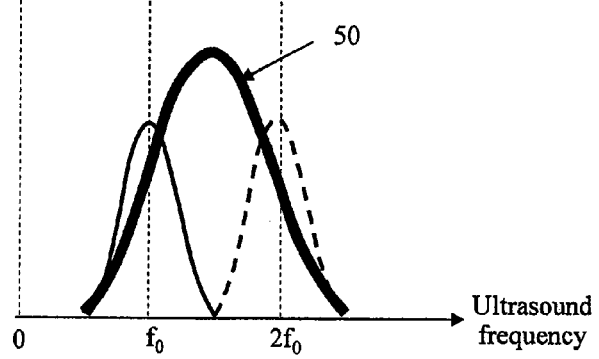

FIGS. 8A and 8B are diagrams showing the fractional bandwidths of a probe overlapped on FIG. 2. Though no range for the vertical axis is shown in FIG. 8A or 8B, it is assumed that the following example has a range from 0 to −6 dB (needless to say, similar arguments can be developed in a case of a range from 0 to −20 dB or in a case of a range from 0 to −40 dB). As shown in FIG. 8A, according to the two-time transmission/reception method of the present invention, the overlapping integration of the two frequency bands and the band of the probe covers most of the entire band of the probe. Meanwhile, as shown in FIG. 8B, according to the conventional method employing a band-pass filtration processing, the overlapping integration of the bandwidth of the probe and any one of the two transmission signals never achieves a full use of a bandwidth 50 of the probe. Accordingly, a comparison between FIGS. 8A and 8B leads a conclusion that also in view of the efficient use of energy within an effective bandwidth, the method of the present invention, in which bands of two frequencies overlap each other, is superior to the conventional method. This results in superior sensitivity in the case of the method of the present invention.

Example 2

Figure 6:
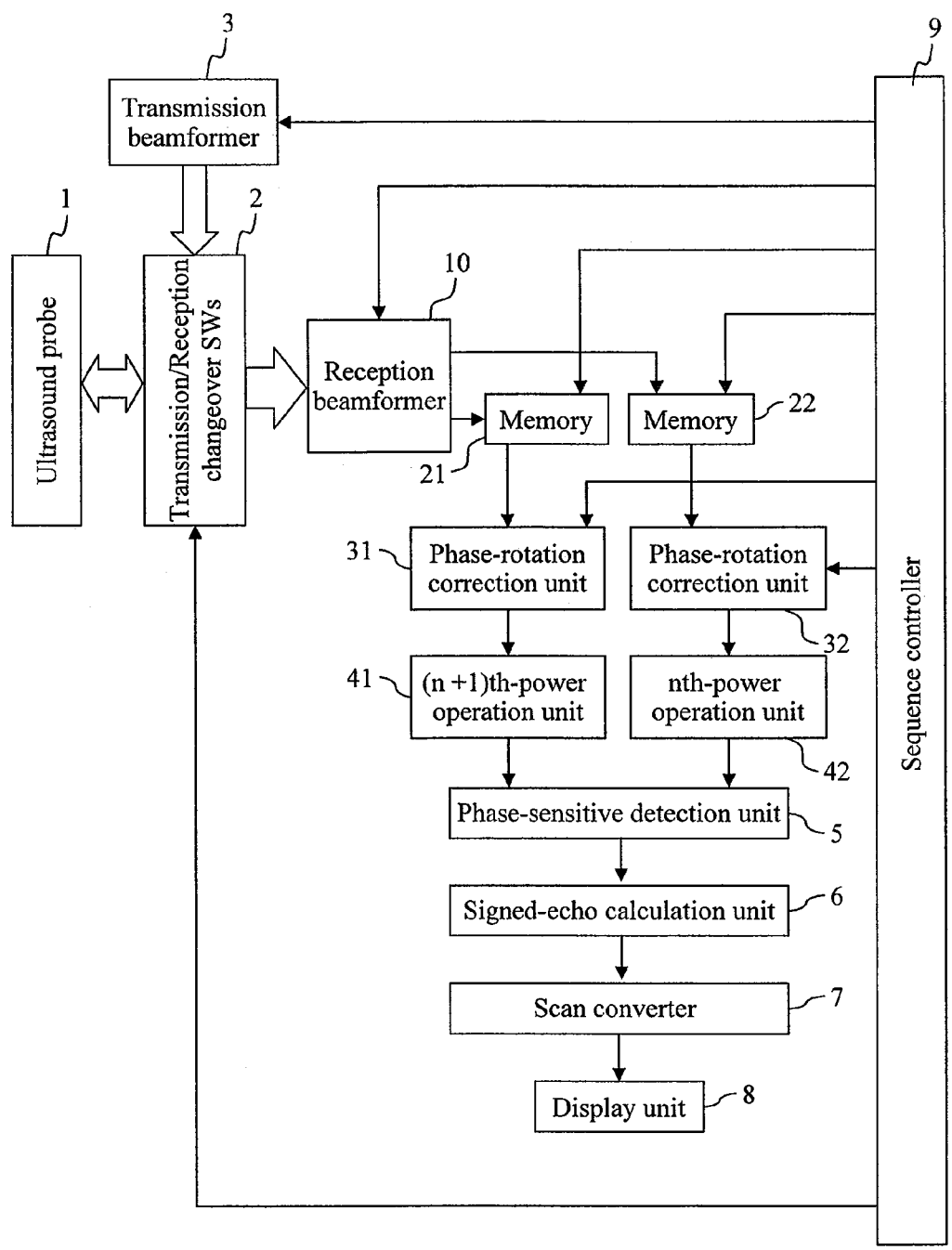
FIG. 6 is a diagram showing another example of the configuration of an ultrasound imaging apparatus according to the present invention.

FIG. 6 is a diagram showing an example of the configuration of an ultrasound imaging apparatus that produces a signed echogram in Example 2 of the present invention. While Example 1 is a configuration example of the apparatus that produces a signed echogram by a method described with reference to FIG. 1A, Example 2 is a configuration example of the apparatus that produces a signed echogram by a method described with reference to FIG. 3A. To put it other way, a difference between Examples 1 and 2 exists in the combination of the center frequencies of the ultrasound pulses that are transmitted and received. The way of signal processing that accompanies each combination also differs between Examples 1 and 2. In Example 2, a signed echo signal for the object to be examined is obtained, as shown in FIG. 3A, in the following way. Firstly, an ultrasound pulse having a center frequency of $nf_0$ is transmitted, and an echo wave produced by the reflection at an acoustic-impedance interface within the object to be examined is received. In addition, another ultrasound pulse having a center frequency of $(n+1)f_0$ is transmitted, and, similarly, an echo wave produced by the reflection at an acoustic-impedance interface within the object to be examined is received. On the basis of these two received echo signals obtained in this way, a signed echo signal for the object to be examined is generated.

The echo signal that is received immediately after the transmission of an ultrasound pulse having a center frequency of $nf_0$ is temporarily stored in a reception memory 21. Meanwhile, the echo signal that is received immediately after the transmission of an ultrasound pulse having a center frequency of $(n+1)f_0$ is temporarily stored in a reception memory 22. The echo signals retrieved from the memories 21 and 22 are sent, respectively, to phase-rotation correction units 31 and 32. In the phase-rotation correction units 31 and 32, phase rotations caused by an ultrasound probe 1, transmission/reception changeover SWs 2, a transmission beamformer 3, a reception beamformer 10, and the like.

The echo signal which has a center frequency of $nf_0$ and which is outputted from the phase-rotation correction unit 31 is inputted into an $(n+1)$th-power operation unit 41. The echo signal thus inputted is raised to the power of $(n+1)$ and is outputted as an echo signal having a center frequency of $n(n+1)f_0$. Meanwhile, the echo signal which is outputted from the phase-rotation correction unit 32 is inputted into an nth-power operation unit 42. The echo signal thus inputted is raised to the power of n and is outputted as an echo signal also having a center frequency of $n(n+1)f_0$. Both of these outputted signals are imputed into a phase-sensitive detection unit 5. A phase-sensitive detection processing can be performed between these inputted signals as these signals have the same center frequency.

Now, a more specific description will be given of the above procedure for the case where n=2. Assume that the echo signal having a center frequency $2f_0$ and outputted from the phase-rotation correction unit 31 is expressed as follows by use of orthogonal functions of sine and cosine: $C_2(t)\cos(2\omega_0 t)+S_2(t)\sin(2\omega_0 t)$. Then, the operation to raise the inputted signal to the power of 3 in the $(n+1)$th-power operation unit 41 is equivalent to the outputting, in accordance with the addition theorem, of $C_{23}(t)=4C_2^3-3C_2$ and $S_{23}(t)=3S_2-4S_2^3$. In addition, assume that the echo signal having a center frequency $3f_0$ and outputted from the phase-rotation correction unit 32 is expressed as $C_3(t)\cos(3\omega_0 t)+S_3(t)\sin(3\omega_0 t)$. Then, the square operation in the nth-power operation unit 42 is equivalent to the outputting, in accordance with the addition theorem, of $C_{32}(t)=C_3^2-S_3^2$ and $S_{32}(t)=2C_3S_3$. Here, $C_2(t)$, $S_2(t)$, $C_3(t)$ and $S_3(t)$ represent real amplitudes.

Since the signals outputted from the operation units 41 and 42 have the same center frequency of $6f_0$, a phase-sensitive detection processing can be performed between these signals. Here, when n is an even number, the signal outputted form the $(n+1)$th-power operation unit 41, which is obtained by raising the received echo signal to the power of an odd number, always inherits the sign of the original echo. Meanwhile, the signal outputted form the nth-power operation unit 42, which is obtained by raising the received echo signal to the power of an even number, always has constant sign irrespective of which of the signs the echo has. Accordingly, this signal outputted from the nth-power operation unit 42 can be used as a reference signal. So, a signed echo signal can be obtained by calculating $C_{O23}(t)=C_{32}C_{23}+S_{32}S_{23}$ and $S_{O23}(t)=C_{32}S_{23}-C_{23}S_{32}$ in the phase-sensitive detection unit 5. The graph at the lowest position in FIG. 3A schematically shows the obtained amplitude of $C_{O23}(t)$ in a compressed manner.

Next, a description will be given of what has to be taken into consideration concerning the waveform and the bandwidth of the wave of the transmission pulse. The ultrasound propagated in a living body is attenuated substantially in proportion to the ultrasound frequency. Accordingly, the center frequency of the ultrasound pulse is shifted more and more to the lower-frequency side as the propagation distance becomes longer. For this reason, what is necessary to produce an echogram on the basis of an echo signal that keeps a favorable ratio of signal to noise, i.e., S/N ratio is some special arrangement with this attenuation in proportion to the frequency being taken into consideration.

Figure 7:
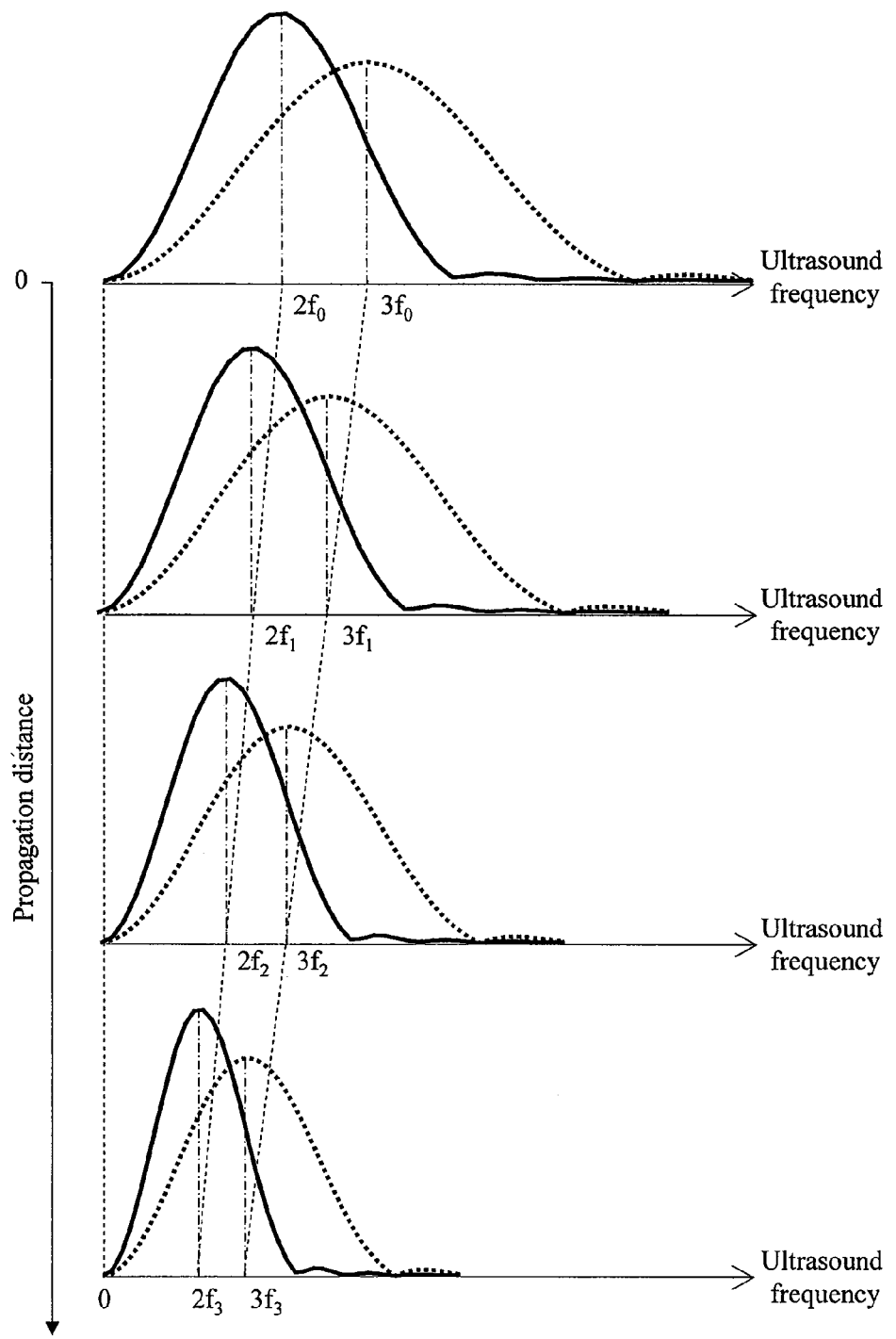
FIG. 7 is a diagram showing how the spectrum of an ultrasound pulse that has spectrum resembling a Gaussian function is changed while the ultrasound pulse is propagated.

This problem can be addressed by using a transmission ultrasound pulse having such a spectrum as those plotted by the solid lines and the broken lines in FIGS. 2A and 4A. The following is a reason for this. Assume that each of two transmission ultrasound pulses has a Gaussian spectrum and the two transmission ultrasound pulses have approximately the same fractional bandwidths. In this case, even shifts of the center frequencies are caused by the attenuation in proportion to the frequency along with the propagation, the ratio of the center frequencies is kept constant. How this is achieved is shown in FIG. 7 with an example of using a transmission ultrasound pulse having a spectrum shown in FIG. 4. The following is a description for the example with formulas. Assume that a frequency spectrum resembles a Gaussian function and has a bandwidth that is proportional to the center frequency $f_0$. The frequency spectrum can be expressed as $A\exp[-(f-f_0)^2/Bf_0]$. By the attenuation that is proportional to a frequency f, the amplitude after the propagation of a distance x is reduced by being multiplied by $\exp(-Cxf)$. Here, each of A, B, and C is a real number. Accordingly, the spectrum after the propagation of a distance x is expressed as:

$$A\exp[-(f-f_0)^2/Bf_0-Cxf]=A\exp[-Cx(1-BCx/4)f_0]\exp\{-[f-(1-BCx/2)f_0]^2/Bf_0\}.$$

To put it other way, the shifted center frequency after the propagation of a distance x is $(1-BCx/2)f_0$. Specifically, when the center frequency at the transmission is $2f_0$, the shifted center is $2(1-BCx/2)f_0$, and when the center frequency at the transmission is $3f_0$, the shifted center is $3(1-BCx/2)f_0$. Accordingly, even after the propagation of a distance x, the ratio of center frequency is unchanged. As a consequence, a signed echo can be produced by a signal processing according to the present operation.

While the foregoing is taken into consideration, in each of the examples of FIGS. 5 and 6, under the control by a sequence controller 9, the center frequency that is assumed in the signal processing is shifted to the lower-frequency side with the time elapsed from the transmission timing to the reception timing. There are various methods of shifting the central frequency to the lower frequency. For example, the following method can be employed to achieve the shifting. Assume a signal that has a center frequency of $f_c$. By use of a reference frequency $f_0$ that is near the frequency $f_c$, the signal having a center frequency of $f_c$ is multiplied by $\sin(f_0 t)$ and is then passed through a low-pass filter that can pass signal components of a frequency lower than the frequency $f_0$. Thus a signal component can be obtained. Meanwhile, the signal having a center frequency of $f_c$ is multiplied by $\cos(f_0 t)$ and is then passed through a low-pass filter that can pass signal components of a frequency lower than the frequency $f_0$. Thus another signal component can be obtained. Accordingly, the reception signal can be shifted to a base band. By shifting gradually this reference frequency $f_0$ to the lower frequency in accordance with the distance, the shifting of the assumed center frequency to the lower-frequency side can be achieved.

Note that the descriptions have been thus far made for the case where two frequencies used are a frequency of n and another frequency of $(n+1)$. The same effects as what has been described in Example 2 can be obtained as long as the two frequencies are a frequency of an even number and a frequency of an odd number. For example, when a frequency of 5 MHz and another frequency of 8 MHz are used, multiplication by 8 is performed at the transmission and reception with 5 MHz, and a multiplication by 5 is performed at the transmission and reception with 8 MHz.

What is claimed is:

1. An ultrasound imaging apparatus comprising:
a probe that transmits and receives ultrasound signals to and from an object to be examined;
a transmission controller that controls the ultrasound signals to be transmitted from the probe;
a signal processing unit that processes the ultrasound signals received by the probe,
wherein the transmission controller is configured to control the probe so as to transmit a first transmission signal and a second transmission signal, the first transmission signal is a first ultrasound signal having a center frequency of nf, the second transmission signal is a second ultrasound signal having a center frequency of mf, in which n is an even natural number, m is an odd natural number, the least common multiple of n and m is $nk_1 = mk_2$, and f is a frequency,
the signal processing unit is configured to perform: a processing to obtain a first echo signal having a center frequency of $nk_1 f$ by raising the first ultrasound signal received in response to the transmission of the first transmission signal to the power of $k_1$; a processing to obtain a second echo signal having a center frequency of $mk_2 f$ by raising the second ultrasound signal received in response to the transmission of the second transmission signal to the power of $k_2$; and a processing to obtain a signed echo signal from the outcome of a phase-sensitive detection processing performed between the first echo signal and the second echo signal.

2. The ultrasound imaging apparatus according to claim 1 wherein the difference between n and m is 1.

3. The ultrasound imaging apparatus according to claim 2 wherein m is 1 and n is 2.

4. The ultrasound imaging apparatus according to claim 1, wherein each of the first transmission signal and the second transmission signal has a frequency spectrum that resembles a Gaussian function, and
the fractional bandwidth of the first transmission signal is approximately equal to the fractional bandwidth of the second transmission signal.

5. The ultrasound imaging apparatus according to claim 1 wherein even when the center frequencies of the first and the second transmission signals are shifted, with the propagation thereof, by attenuation that is proportional to the respective frequencies, the ratio of the center frequencies is kept constant.

6. The ultrasound imaging apparatus according to claim 1 wherein the first transmission signal has a frequency band that is overlapped with the frequency band of the second transmission signal.

7. The ultrasound imaging apparatus according to claim 6 wherein when the ratio of the center frequency of the first transmission signal to the center frequency of the second transmission signal is 1 to 2, and when the fractional bandwidth of each of the first and the second transmission signals is $df/f_0$, the overlapping of the bandwidths is approximately $(3/2)df-f_0$, where df is the bandwidth of a lower frequency one of the first transmission signal and the second transmission signal, and $f_0$ is the center frequency of the lower frequency one of the first transmission signal and the second transmission signal.

8. The ultrasound imaging apparatus according to claim 6 wherein when the ratio of the center frequency of the first transmission signal to the center frequency of the second transmission signal is 2 to 3, and when the fractional bandwidth of each of the first and the second transmission signals is $df/f_0$, the overlapping of the bandwidths is approximately $(5/2)df-f_0$, where df is the bandwidth of a lower frequency one of the first transmission signal and the second transmission signal and $f_0$ is the center frequency of the lower frequency one of the first transmission signal and the second transmission signal.

9. The ultrasound imaging apparatus according to claim 1 further comprising a means for detecting, from a phase change in the direction of the propagation of the echo signals, a phase shift of the received waveform caused by a spatial change in the acoustic impedance of the object to be examined and a phase shift of the received waveform caused by other factors while the two types of phase shift are discriminated from each other.

10. The ultrasound imaging apparatus according to claim 1 further comprising a means for displaying any one of an acoustic impedance of the object to be examined, a spatial change of the acoustic impedance (signed echo), and phase information caused by the spatial change of the acoustic impedance.

* * * * *